United States Patent [19]

Wilson

[11] Patent Number: 4,756,835
[45] Date of Patent: Jul. 12, 1988

[54] PERMEABLE MEMBRANES HAVING HIGH FLUX-DENSITY AND LOW FOULING-PROPENSITY

[75] Inventor: Donald R. Wilson, Borough of Hopatcong, N.J.

[73] Assignee: Advanced Polymer Technology, Inc., Landing, N.J.

[21] Appl. No.: 901,827

[22] Filed: Aug. 29, 1986

[51] Int. Cl.$^4$ ............................................. B01D 13/00
[52] U.S. Cl. ...................... 210/651; 210/652; 210/321.84; 210/321.83; 55/16
[58] Field of Search ............... 210/321.1, 321.2, 321.3, 210/632, 487, 456, 321.83, 321.84, 651, 652; 55/16, 158

[56] References Cited

U.S. PATENT DOCUMENTS

| | | | |
|---|---|---|---|
| 2,982,416 | 5/1961 | Bell | 210/321.1 |
| 3,401,798 | 9/1968 | Nyrop | 210/487 X |
| 3,578,173 | 5/1971 | Streeton | 210/321.1 |
| 3,695,445 | 10/1972 | Esmond | 210/321.3 |
| 4,028,250 | 7/1977 | Loft | 210/487 X |
| 4,212,742 | 7/1980 | Solomon et al. | 210/456 X |
| 4,328,102 | 5/1982 | Bellhouse et al. | 210/456 X |
| 4,361,484 | 11/1982 | Larsson et al. | 210/632 |
| 4,369,112 | 1/1983 | Vincent et al. | 210/456 X |
| 4,451,370 | 5/1984 | Murai et al. | 210/321.1 |

Primary Examiner—Frank Spear
Attorney, Agent, or Firm—Kenneth E. Macklin

[57] ABSTRACT

A permeable membrane system comprised of at least two sheets, at least one of the two sheets being a grooved permeable membrane having regularly spaced grooves on at least one surface, the grooves having a predetermined spacing factor, the grooved permeable membrane either having essentially no barrier layer or having a barrier layer on one grooved surface, the sheets being positioned in a configuration with the grooves of that one grooved surface of the grooved permeable membrane sheet forming feed channels with a surface of another sheet which covers that one grooved surface, the grooves being about 0.5 to about 100 mils wide and deep and the feed channels being used to deliver the feed stream to the membrane surface. Preferably, both sheets are permeable membranes. The grooves in the sheets are preferably about 5 to about 35 mils wide and deep for reverse osmosis, about 0.5 to about 20 mils wide and deep for gas separation, and about 15 to about 75 mils wide and deep for ultrafiltration. The grooves on one side of one sheet may be aligned with the grooves on one side of an adjacent sheet, whereby the grooves on one side of one sheet form parts of the feed channels and the corresponding grooves on one side of the other sheet form the other parts of the feed channels. Or, the grooved sheets may be alternated with planar sheets so that the grooves on one side of the grooved sheets form the feed channels with the adjacent surface of a planar sheet.

39 Claims, 4 Drawing Sheets

40

50

PERMEABLE MEMBRANES HAVING HIGH FLUX-DENSITY AND LOW FOULING-PROPENSITY

This invention is concerned with a novel permeable membrane system, which is useful for reverse osmosis, ultrafiltration, gas separations and other separation and filtration processes as well as membrane reactor systems. The membranes may be made from conventional materials in the novel configuration.

BACKGROUND OF THE INVENTION

Permeable membranes may be used in a number of separation or filtration processes when the membranes are properly configured. Properly configured membrane modules may be used for reverse osmosis, ultrafiltration, gas separation, liquid-liquid separation, and supported liquid membrane systems.

Reverse osmosis is a pressure-driven process used for separating solvent from solute and particulate matter. A membrane with a thin dense skin, or barrier layer, over a porous substrate is normally used. Sufficient pressure to overcome the osmotic pressure of the stream being purified or concentrated is used. For sea water (about 3.5% salt), this requires more than 350 psi. and typically about 800 psi. For brackish waters (about 0.5% salt), lower pressure, about 400 psi, is used. The principal uses for reverse osmosis membranes are for the purification of water and the concentration of aqueous solutions. Desalination of sea and brackish water is the major application, accounting for about half the market. Other developing large market opportunities include agricultural water, food processing water, industrial waste streams and municipal waste water.

The driving force for increased utilization of reverse osmosis is its potential for large energy savings compared to other processes. Because a phase change of solvent is not required, as in distillation or crystallization, the process is much more energy efficient. Only one tenth or less of the energy for evaporation is required. However, this advantage decreases for very concentrated solutions which require higher pressure and have lower fluxes through a membrane. For seawater, which has a high salt concentration, the energy saving over the most efficient distillation process is about 50%.

Ultrafiltration is a size-exclusion separation process for both soluble and insoluble matter. Membranes for this process contain pores of a desired diameter, which, depending on size, pass molecules or particles in the range of 10 to 200 Å diameter while retaining larger molecules or particles. Thus, molecules in the range of 300–300,000 molecular weight can be passed or retained while most salts will pass and colloidal particles will be retained. Membranes, or filters, which retain larger species, in the range of 0.02 to 10 mu are generally referred to as microfilters for microfiltration. However, in practice this distinction between ultrafiltration and microfiltration is arbitrary and is not so sharply defined.

Some of the important uses for ultrafiltration include: (1) the recovery of paint from the rinse tank in the electrophoretic painting process—the paint is recycled to the dip tank and the purified rinse water is reused; (2) the breaking of oil-water emulsions common to machinery and metal finishing operations; (3) the recovery of polymer latex wastes and polymeric sizing agents used in fabric finishing; and (4) the separation and concentration of foods, pharmaceuticals and biologicals. The pressures used in ultrafiltration (about 10–100 psi) are lower than in reverse osmosis because there is no significant osmotic pressure generated across the membrane. The hollow-fiber (tube-fed) systems are preferred although limited to about 25 psi in operation. This is the result of the hoop strength limit of the fibers and integrity of the end seals which contain the fibers. Spiral-wound systems can operate at higher pressures (100 psi), but higher flux rates are not achieved because higher pressure drops are necessary to achieve a given flow velocity due to the restricted flow caused by the feed channel spacer screens [R. S. Tutunjian, "Scale-up Considerations for Membrane Processes", *Biotechnology*, Vol. 3, July 1985, pp. 615–626].

Tubular and plate-and-frame systems have the distinct disadvantages of high hold-up volumes and high space requirements. The concepts of this invention will have the attributes of the hollow-fiber system and higher flux rates will be achieved because higher pressures can be tolerated.

Gas Separation by membranes is a pressure-driven process used to concentrate one or more components in, or from, a multicomponent gas stream. The membranes used for the various processes have a tight dense skin (over a microporous support) which has a higher permeability for one gas over another. Permeability coefficients are a product of the diffusion coefficient and the solubility coefficient. A particular problem in gas separation membranes is that small pores, cracks or fissures may be far more critical than in liquid separations. The low absorption, viscosity and cohesive properties of gases makes the contribution of flow through these channels devastating with many membrane systems. U.S. Pat. No. 4,230,463, "Multicomponent Membranes for Gas Separations" provides for a coating of membrane surfaces with a second material to decrease gas flow through such openings. The advantage in membrane separations as with the other processes is again the large energy savings which result from not having to cause a phase change of the materials in order to effect the separation. Another advantage can be breaking an azeotrope which cannot be broken by simple distillation. A disadvantage may be that the gases produced are not as pure as can be achieved by other means. However, the commercial use of membranes for gas separations has been growing rapidly in recent years. Major uses include: the separation of hydrogen in ammonia plants; separation of carbon dioxide in enhanced oil recovery operations, and in the cleanup of natural gas and landfill gas; and air separation to produce concentrated nitrogen for blanketing of combustible materials and to produce oxygen enriched air for both medical purposes as well as for more efficient combustion and oxidation processes. Both hollow-fiber and spiral-wound systems compete, but the former system has the advantage of about three times the surface area of the spiral-wound units. However, it has been reported that the spiral-wound units can be mounted in any position and that operating personnel can more easily change elements. In contrast, hollow-fiber units are usually installed vertically to prevent the fibers from packing together and are not so readily changed. [G. Parkinson, S. Ushio, and R. Lewald, "Membranes Widen Holes in Gas Separations", *Chemical Engineering*, Apr. 16, 1984, pp. 14–19.]

Liquid separations (which are reverse osmosis processes), like gas separations, are pressure-driven processes and are based on the selective permeability of one or more components in a multicomponent stream. A process is currently being commercialized by Allied-Signal for the separation of light hydrocarbons from heavy oils. A number of studies have also been reported for the separation of various liquids such as alcohols from water. A variation called pervaporation maintains a gas phase on the outlet side of the membrane by the application of a vacuum to the permeate side. Later the permeate is condensed to a liquid. Most bulk liquid separations have been effected with this process. Examples include the separation of azeotropic mixtures such as the benzene-cyclohexane azeotrope and the separation of very similar compounds such as the isomeric xylenes.

Supported liquid membrane systems contain a liquid impregnated in the micropores of a solid membrane. The liquid is held in place by capillary action. The solid membrane can be a flat sheet, spiral-wound or hollow-fiber type. The liquid selectively permits the passage of a particular component from a mixture. Liquid membranes generally separate by their selective solubility for a given substance. The immobilized liquid generally contains an agent that complexes with the species to be separated, transfers the species through the membrane, then releases the species and returns to repeat the process. For example, Bend Research, Inc. has reportedly developed a process for recovering chromium from electroplating solutions. A waste stream containing 300 ppm chromium was reportedly cleaned to below 10 ppm, and a concentrated stream containing 5 wt % chromium was produced. In addition, Bend Research, Inc. has reportedly developed a process for reducing a uranium leach water containing 100 ppm uranium salt to 10 ppm and producing a 3 wt % concentrate. [Chemical Engineering, Apr. 18, 1983, pp. 9–10.]

Membrane reactor systems are an emerging technology, particularly in biotechnology. As is described in "Membranes In Biotechnology, State of the Art" [A. S. Michaels and S. L. Matson, *Desalination*, 53, (1985) 231–258] and references cited therein, such systems with appropriate membranes can bring about both biocatalysis and product separation.

A recent assessment of membrane technology and its applications was performed for the United States Department of Energy [S. A. Leeper, D. H. Stevenson, P. Y. -C. Chiu, S. J. Priebe, H. F. Sanchez and P. M. Wikoff, "Membrane Technology and Applications: An Assessment," DOE Contract #AC07-761D01570, NTIS #DE84009000, Feb. 1984]. A number of areas were reviewed in that report, which cited numerous opportunities for significant energy savings through the use of membranes. The applications included waste water treatment and recycle, concentration by reverse osmosis rather than evaporation, recovery of valuable materials from waste wash waters, processing of hot waste streams to allow recycle of water and sensible heat, and concentration of heatsensitive products.

One area cited in the above assessment as having a very large potential for energy savings through the use of reverse osmosis processes is the food industry. In 1976, the food processing industry used a total of $940 \times 10^{12}$ Btu. Evaporation and drying accounted for $132 \times 10^{12}$ Btu, and it was concluded that $30 \times 10^{12}$ Btu could be saved in the food industry by using membranes for two-fold concentration of liquids. It was also noted that "Additional, and perhaps more significant, savings could result from the use of hot process water recycling, reduced energy requirements for transportation, storage and cooling of liquids not usually concentrated (e.g., milk) and reduced costs of vegetable oil extraction by using reverse osmosis recovery of solvent rather than distillation." The reference indicates that among the requirements of the food industry for reverse osmosis applications are low fouling, high temperature capability, and solvent resistance.

The most severe limitation of reverse osmosis systems for the food industry is their fouling problem. Concentration of food products and purification of food process water streams require exposure of the membrane systems to "dirty" streams compared to those normally encountered in cleaner applications such as desalination or water purification, where substantial prefiltration is acceptable.

The only reverse osmosis membrane configurations currently practical for use in this industry are the tubular and plate-and-frame. This is because of their low fouling properties and minimal prefiltration requirements and in spite of their low flux densities and higher costs. The more popular, high flux density and cheaper, spiral-wound and shell-fed hollow-fiber systems are not as applicable to the food industry. The major reason is their difficulty in handling "dirty" separations which have a high propensity to foul the membrane surface.

Other areas reviewed in the referenced assessment were: (1) mining, primary metal recovery, and fabricating metal products; (2) manufacturing textile and leather products; (3) producing pulp and paper products; (4) hydrocarbon extraction and refining; (5) chemical process industries, (6) medical and health care; and (7) domestic, municipal and commercial water treatment.

Prefiltration requirements and fouling of the existing high flux-density membrane systems limit their applicability as well as add significantly to the cost of separations. A primary objective of this invention is the design of a high flux-density membrane separation system with minimal prefiltration requirements and a low propensity to foul. Other advantages will become obvious in the following description.

PRIOR ART

There are basically two types of permeable membranes having barrier layers, both of which are asymmetric, dense-skinned, and thin-film composite.

These are used in the following five basic configurations:

plate-and-frame, tubular, spiral-wound, hollow-fiber, shell-fed, hollow-fiber, tube-fed.

These membranes and configurations are reviewed in depth in a number of places (e.g., Leeper et al. cited above), and will not be repeated here. However, the features of the various configurations for reverse osmosis separations will be reviewed.

Table 1 lists a comparison of the properties of the different commercial configurations. The tube-fed hollow-fiber system was to be produced by Consep, Inc., Bend River, Ore., but attempts to commercialize the system have been suspended. Although a range of numbers might be used for the first two entries of properties, the numbers used are representative of state-of-the-art technology for brackish water separations. The plate-and-frame and tubular data were taken from the assessment by Leeper et.al. (p. 35). The spiral-wound data is for a Hydranautics unit [A. M. Desai, "Performance of Hydranautics Reverse Osmosis (RO) Test Units at Yuma Desalting Facility," *Desalination*, 23, (1977), 367–381], and the hollow-fiber shellfed data is for DuPont's Permasep ® B-9 separator ["8" Diameter B-9 Permasep ® Permeator Model No. 0840 Product Specifications," *Dupont Product Bulletin* #225 (1983); and "Chemical Processing Applications in Separations/Membranes," Report No. 82-3, Chem Systems, Inc., Tarrytown, N.Y., August 1983]. The data for the tube-fed hollow fiber system represents that reported by Bend Research, Inc. [W. C. Babcock, R. W. Baker, R. P. Barss, B. A. Kruse-Smith and H. K. Lonsdale, "Development of Composite Hollow Fibers—Phase III", OWRT Contract #14-34-0001-0508 to Bend Research, Inc., available from NTIS, Report #PB83-108068; and W. C. Babcock, E. K. L. Lee, R. J. Ray and C. A. Speckman, "Energy-Efficient Membrane Separations in the Sweetener Industry", DOE Contract #DE-AC07-82ID12425, available from NTIS, Report #DE85006586].

TABLE 1
COMPARISON OF MODULE
CONFIGURATIONS FOR REVERSE OSMOSIS

| Property | Plate-and-Frame | Tubular | Spiral-Wound | Hollow-Fiber Shell-Fed | Hollow-Fiber Tube-Fed |
|---|---|---|---|---|---|
| Packing Density ($ft^2/ft.^3$) | 75 | 75 | 300 | 4000 | 400 |
| Permeate Flux ($gal/ft^2/day$) | 20 | 20 | 20 | 3 | 10 |
| Flux Density ($gal/ft^3/day$) | 1500 | 1500 | 6000 | 12000 | 4000 |
| Conversion/Lineal Ft. | Low | Low | Moderate | High | Moderate |
| Surface Area/Feed Channel ($ft^2/in^3$) | 0.069 | 0.056 | 0.28 | 3.6 | 2.8 |
| Parasitic Pressure Loss | Very Low | Very Low | Low | High | Moderate |
| Concentration Polarization | Very Low | Very Low | Moderate | High | Low |
| Fouling | Very Low | Very Low | Moderate | High | Low |
| Prefiltration Requirement | Minimal | Minimal | Extensive | Extensive | Minimal |
| Module Cost | Expensive | Expensive | ← Inexpensive → | | Moderate |

Comparison of the systems in Table 1 will depend on the specific application and will revolve around operability and total cost of water produced. Thus, the plate-and-frame and tubular systems suffer from expense of the module, high holdup and low productivity per module. Nonetheless, there are some applications where their operability in terms of low fouling and low prefiltration requirements make them the only suitable systems in spite of the cost. The spiral-wound and hollow-fiber shell-fed systems are very competitive with each other in operability and cost. The cost of their modules when compared on the basis of the cost per gallon of water produced is almost an order of magnitude less expensive than the plate-and-frame and tubular systems. The prefiltration needs are much more extensive and for desalination can account for 20 to 40% of the water cost, but they are still the lower cost systems by far. However, there are a number of applications where minimal prefiltration requirements and low fouling are critical, such as food processing, where the feed stream contains a high concentration of suspended solids. Other examples include fermentation broths and other process and waste streams. The tube-fed hollow-fiber system which was to have been produced by Consep, Inc. has some demonstrated ability to handle "dirty" streams with minimal prefiltration. Although more expensive on a module basis than the spiral-wound and hollow-fiber shell-fed system, and possessing a lower flux density, the lower prefiltration requirements would have made it cost competitive for most applications. A detailed discussion of the properties in Table 1 follows.

Packing Density—The plate-and-frame and tubular modules have the least amount of membrane surface per sq. ft. and the shell-fed hollow-fiber, the most. Although increased packing density has led to other problems discussed below, the much larger surface area of the spiral-wound and hollow-fiber systems has led to their much lower cost per gallon of permeate and their overwhelming market share.

The tube-fed hollow-fiber system is a recent entry and is comparable to the spiral-wound in packing density. However, the density shown is perhaps a practical maximum. The lumen diameter of 10 mils is at a maximum to minimize fouling and pressure drop, but is limited by the requirements for fiber-hoop strength. A large fiber thickness (30 mils) is also dictated by the required hoop strength.

Permeate Flux—Permeate flux is dependent on rejection, pressure and osmotic pressure of the feed solution. The fluxes given are typical for brackish water feeds at 400 psi with 90–95% rejection. Hollow-fiber systems have never had the flux that has been observed in flat sheets, which offsets the higher packing density. Flux is also reduced by concentration polarization and fouling as discussed below.

Flux Density—The spiral-wound and hollow-fiber systems have comparable flux densities whereas the plate-and-frame and tubular systems are much lower.

Conversion/Lineal Foot—The shell-fed hollow-fiber system is the best and a four foot long module can give a conversion of 75%. A number not normally quoted but shown in Table 1 is the Surface Area/Feed Channel Volume. Combined with flux and flow rate, it gives an indication of the conversion of feed which can be expected per lineal foot. This then gives an indication of the amount of recycle or number of modules that need to be used to give adequate conversion of feed. The higher the number, the greater the conversion will be for a given flux and feed rate. It can be shown that for a given feed channel the following relationship holds true.

Conversion = K(FL/V)

where: K = a numerical constant, F = flux rate, L = module length, and V = feed rate. K increases as the Surface Area/Feed Channel Volume value increases.

Thus a higher flux rate as observed for the spiral-wound unit can offset the higher number shown for the hollow-fiber tube-fed system.

Parasitic Pressure Loss—This is the loss which occurs to the feed as a result of going through small channels—the smaller the channel and the longer it is, the more pressure loss. The number is least important for the shell-fed hollow fiber system due to the radial flow design involving very short distances (inches).

However, for the other configurations it is important; and for the tube-fed hollow-fiber system, it amounts to almost 10 psi/ft. with pure water. For spiral-wound units this number is normally only 1–2 psi/ft. Pressure drop will also increase with viscosity of the feed stream. If many modules are required to achieve the requisite conversion, then repressurization will be required. The relationship of pressure loss per lineal foot to size of channel is:

$$\Delta P = V^2 \rho f / D$$

where $\Delta P$ = pressure loss/lineal ft, V = feed rate, $\rho$ = density, D = feed channel diameter, f = Fanning factor (dependent on Reynolds's number).

At the feed rates normally used in spiral-wound and hollow-fiber systems, f is proportional to viscosity and the reciprocals of flow diameter and density. It then follows that pressure drop is linearly related to flow, viscosity ($\eta$) and to the reciprocal of tube diameter squared as follows ($\alpha P \alpha V \eta / D^2$). The tube-fed hollow-fiber system operates above 1.5 ft/sec. to minimize concentration polarization and would clearly benefit if larger tubes could be used.

Concentration Polarization (Cw/Cb)—This is defined as a gradient of solute concentration at the membrane surface and is the result of a much higher flux of solvent than back diffusion of solute to the bulk solution. Polarization is most severe in shell-fed hollow-fiber systems due to the many small channels and dead spots. Although feed channels in spiral-wound systems are large, the spacer creates many dead spots. Only the plate-and-frame, tubular and tube-fed hollow-fiber systems have good positive flow without dead spots.

Sherwood et.al [T. K. Sherwood, P. L. T. Brian, R. E. Fisher and L. Dresner, *I.&E.C. Fund.*, 4, (1965), 2] have derived the following relationship:

$$C_w/C_b = \exp(V(Sc)^{\frac{2}{3}}/j_D U_b)$$

where: V = flux rate of solvent, Sc = Schmidt number = u/D, u = kinematic viscosity, $U_b$ = bulk velocity, and $j_D$ = Chilton-Colburn j factor.

For turbulent flow in round tubes (not generally the case), the j factor is about f/2, where f is the Fanning friction factor. These equations suggest that conditions which exacerbate concentration polarization are high flux and low bulk velocity. Small channel diameters and large molecular weight solutes (such as found in food processing) will also increase polarization.

Fouling—Fouling is the term applied to losses in membrane permeability due to deposition of gels and fine particulate debris that may enter with the feed, as well as precipitation of the supersaturated solute. As may be seen, the severity of the fouling problem closely parallels the concentration polarization problem. Extensive prefiltration of feed is required for spiralwound and shell-fed hollow-fiber systems, and these systems are not readily applicable to "dirty separations" such as found in food processing. This is part of the reason for the continued market presence of plate-and-frame and tubular systems in spite of their higher cost.

One of the main advantages claimed for the tube-fed hollow-fiber system is its anti-fouling properties achieved through the presence of unobstructed positive flow channels. Less fouling than a spiral-wound unit has been demonstrated in several tests.

Prefiltration—As noted in the discussion of fouling, the unobstructed positive flow channels of the plate-and-frame, tubular, and tube-fed hollow-fiber systems can handle "dirty" separations and have minimal requirements for prefiltration in most applications to minimize fouling problems.

Module Cost—When flux is compensated for, the spiral-wound and hollow-fiber systems are comparable in cost and much less expensive than the plate-and-frame and tubular systems. However, this does not represent the total costs for product water. It has been reported that prefiltration requirements of the spiral-wound and hollow-fiber shell-fed system may represent 25–40% of the total cost in water desalination. Therefore, the tube-fed hollow-fiber system could be the cheapest because of minimal pretreatment costs associated with it.

U.S. Pat. No. 2,960,462 describes the manufacture of a laminated membrane which consists of a thin layer of film of a selective membrane material mounted upon a thicker film of a membrane material having a higher permeation rate. The use of the membrane for separation processes is also described.

U.S. Pat. No. 3,580,841 discloses composite membranes having an ultrathin film barrier layer atop a microporous support, which may be used for reverse osmosis.

U.S. Pat. No. 3,401,798 describes membranes having spaces used as feed conduits which are formed by nonplanar membrane surfaces in contact with each other or in contact with a planar surface. However, the nonplanarity is not inherent in the membranes themselves, but is the result of forming laminates on a corrugated porous support. The laminates shown in FIGS. 2, 3, 5 and 7 of that patent have a corrugated shape which forms spaces 28 and 30 as feed conduits (col. 2, lines 46–52; col. 4, lines 1–17; and col. 5, lines 16–47). The conduits thus formed do not have the preferred shapes of the present invention, are necessarily larger than the preferred groove sizes of the present invention due to the need to conform to the support, and are more complex to manufacture.

U.S. Pat. No. 4,206,050 discloses the use of nonplanar or profiled membrane surfaces in contact with one another where the spaces so formed between the membrane surfaces form the feed conduits. The patent relates to a membrane unit and apparatus comprising at least one permselective membrane and a fluid-absorbing and/or fluid-draining carrier containing at least one absorbent for removing metabolites from blood (Abstract of the Disclosure). The spirally wound membrane unit shown in FIG. 1 comprises a profiled fluid-absorbing carrier 2 covered on both sides by a permselective membrane 1. When the fluid-absorbing carrier and thus the membrane are profiled, the spacers may be omitted (col 5., lines 47-49). When the permselective membrane 1 has no profile, a spacer, for example, in the form of a mesh net, must be provided in order to maintain a cavity through which the blood may pass (col. 5, lines 28-32). The fluid-absorbing carrier may have a profile formed by regularly distributed burls or corrugations, onto which a permselective membrane is applied on one or both sides, so that the membrane itself is profiled (col. 4, lines 27-31). Thus, as in U.S. Pat. No. 3,401,798, the permselective membrane of U.S. Pat. No. 4,206,050 is not inherently grooved as in the present invention and suffers from the same deficiencies as the membranes in U.S. Pat. No. 3,401,798.

U.S. Pat. No. 3,578,173 discloses a membrane containing ridges or grooves on the rear surface of a membrane formed by casting upon a grooved or ridged surface of a casting plate. The barrier layer is on the opposite surface of the membrane, i.e., the planar, non-grooved, surface. The membrane can then be supported by a nonporous backing plate, the grooves in the membrane defining channels for the liquid flow to or from the rear surface of the membrane and the membrane being held on the backing plate by a positive differential liquid pressure of the feed applied to its front planar surface (col. 1, lines 22-30). It is also disclosed that the membrane can be folded back upon itself at an angle to the grooves so that no backing plate is required and providing free passage for the (permeate) liquid. However, in the present invention, the ridges are never placed in contact at crossed angles which would limit the pressure which could be applied. In the example of the patent, the grooves were deformed when used at 500 psi.

U.S. Pat. No. 4,451,370 describes the preparation of a semipermeable membrane with regular corrugations or parallel linear ribs by casting the membrane onto a corrugated backing or by embossing a flat membrane with a corrugated pattern by applying heat and pressure thereto. The difficulties in accomplishing the former in a well controlled manner would be formidable, and generally the latter would be most difficult without significantly altering the permeability of the membrane. The patent describes a membrane separation element comprising a pair of the corrugated semipermeable membranes. The two membranes are disposed one against the other in such a manner that the parallel fluid passages defined by one of the membranes cross those defined by the other membrane (col. 1, lines 50-53). The passages for the fluid to be treated on one membrane and those on the other membrane may cross each other at an angle of about 30° to 90°, or more preferably 45° to 90° (col. 2, lines 41-44). The primary advantage claimed is that this construction ensures that the fluid to be treated is repeatedly divided and joined as it flows along the mutually crossing passages between the two membranes (col. 2, lines 7-9). It states that without the mutually crossing fluid passages, as disclosed, for example, in U.S. Pat. No. 3,401,798, that the fluid entering one of the passages is confined therein until it leaves the device and as a result, the shape, dimension and the accuracy of the fluid passages have a critical bearing on the flow of the fluid (col. 4, lines 3-10).

In direct contrast, the present invention does not have any form of crossing passages because this leads to eddies and stagnant areas or dead spots. Such areas, as is common in spiral-wound units using web spacers, have increased concentration polarization and fouling. Further, the cross mixing will lead to increased back pressure for the size of channels used. In the present invention, the shape, dimension and the accuracy of the fluid passages are well controlled.

SUMMARY OF THE INVENTION

Briefly, the invention comprises a permeable membrane system comprised of at least two sheets, at least one of the two sheets being a permeable membrane and at least one of the two sheets having regularly spaced grooves on at least one surface, the sheets being positioned in a configuration with the grooves on the surface of one sheet forming feed channels with a surface of the covering sheet. In the preferred configurations both sheets are permeable membranes. In stacks containing several pairs of sheets, each pair may be separated with a conventional carrier cloth to transport the permeate away from the membrane surface. The grooves in the sheets are preferably about 0.5 to about 100 mils wide and deep, more preferably about 5 to about 35 mils wide and deep for reverse osmosis membranes, about 15 to about 75 mils wide and deep for ultrafiltration membranes, and about 0.5 to about 20 mils wide and deep for gas separation membranes. In one configuration of the system, the grooved sheets may be positioned so that the grooves in one sheet are aligned with the grooves in the adjacent sheet, whereby the grooves in one sheet form parts of the feed channels and the corresponding grooves of the other sheet form the other parts of the feed channels. Or, the grooved sheets may be alternated with planar sheets so that the grooves of the grooved sheets form the channels with the adjacent surface of a planar sheet. The sheet may instead be arranged with grooves for feed channels covered by the planar surface of a sheet with grooves on its other surface for a permeate channel which are parallel or perpendicular to the grooves of the sheet for the feed channels. In still another configuration, at least one of the sheets contains grooves for feed channels on one surface of the membrane and parallel or perpendicular grooves for a permeate channel on the other surface of the membrane. In the latter two cases, the carrier cloth for permeate may be omitted. Conventional membrane materials may be used to form the grooved membrane sheets. The sheets may be cast from solutions onto substrates having ridges corresponding to the grooves desired in the sheet or may be extruded from appropriately configured dies. If the membrane systems require a barrier layer, the casting may be conducted to result in an integral barrier layer on the surfaces having grooves for feed channels. Alternatively, the permeable membrane sheets may have a separately applied coating of a barrier layer on the surfaces having grooves for feed channels. In systems requiring a barrier layer, the part of the surface on the adjacent membrane sheet which will complete the feed channel also has an integral or coated barrier layer.

The permeable membrane system is preferably made in the plate-and-frame or spiral-wound configuration.

For reverse osmosis and liquid-liquid separations, the novel membrane systems combine the advantages of conventional tubular and spiral-wound configurations without the disadvantages of either. Flux densities will be equivalent to or higher than the best conventional systems; pretreatment requirements will be minimal; fouling propensity will be low; and in the reverse osmosis process, the module costs per volume of water processed should be less than conventional spiral-wound or hollow-fiber units.

The novel systems of this invention have unexpected properties and benefits and are useful under severe application conditions.

It is a further object of this invention to provide novel membrane systems which do not have the distinct disadvantages of high hold-up volumes and high space requirements of the tubular and plate-and-frame systems. It is a still further object of this invention to provide a membrane system which will have the attributes of the hollow-fiber tube-fed system, but will achieve higher flux densities. These and other objects and advantages of the invention will be apparent from the specification.

DESCRIPTION OF THE PREFERRED EMBODIMENTS

Although the membranes of the invention can be used for all the different separation and filtration processes mentioned above under the Background of the Invention, the preferred application is as a reverse osmosis membrane. For that application, the main objective is to construct a moderately high surface area membrane system which is inherently superior in controlling concentration polarization and fouling. This is done by providing for positive flow of feed solution in sufficiently large channels and by avoiding dead spots. In a positive flow system, cleaning by chemical or physical methods can also be more readily achieved.

The module design objectives are:
feed channels with positive flow and no obstructions,
feed channels sufficiently large to minimize fouling,
maximization of membrane surface area and minimization of membrane material, and
more viable configuration for manufacture and use than the tube-fed hollow-fiber system.

The invention achieves these objectives by constructing modules based on microporous membrane sheets containing regularly spaced grooves preferably about 0.5 to about 100 mils wide and deep, and more preferably about 5 to about 35 mils wide and deep for reverse osmosis separations, about 15 to about 75 mils wide and deep for ultrafiltration and about 0.5 to about 20 mils wide and deep for gas separations. The modules are preferably of either a plate-and-frame or spiral-wound design. The grooves when covered with another membrane sheet will serve as the feed channel and will obviate the need for a feed channel spacer normally used in spiral-wound and flat-plate modules.

Briefly, the invention comprises a novel permeable membrane system comprised of at least two sheets, at least one of the two sheets being a permeable membrane and at least one of the two sheets having regularly spaced grooves on at least one surface, the sheets being positioned in a configuration with the grooves on the surface of one sheet forming feed channels with a surface of the covering sheet. In the preferred configurations, both sheets are permeable membranes.

The grooved sheets preferably range from about 1 mil to about 10 mils thicker than the depth of the grooves, more preferably from about 2 to about 5 mil thicker. The planar sheets preferably range from about 1 mil to about 10 mils in thickness and more preferably from about 2 to about 5 mils in thickness. The sheets may contain a supporting fabric layer such as woven polyester sailcloth or non-woven polypropylene fabric. Said fabric layers are used in many conventional membrane sheets for increased structural integrity.

In one embodiment of the novel permeable membrane system, the grooved sheets may be positioned so that the grooves in one sheet are aligned with the grooves in the adjacent sheet, whereby the grooves in one sheet form parts of the feed channels and the corresponding grooves of the other sheet form the other parts of the feed channels.

Figure 1:
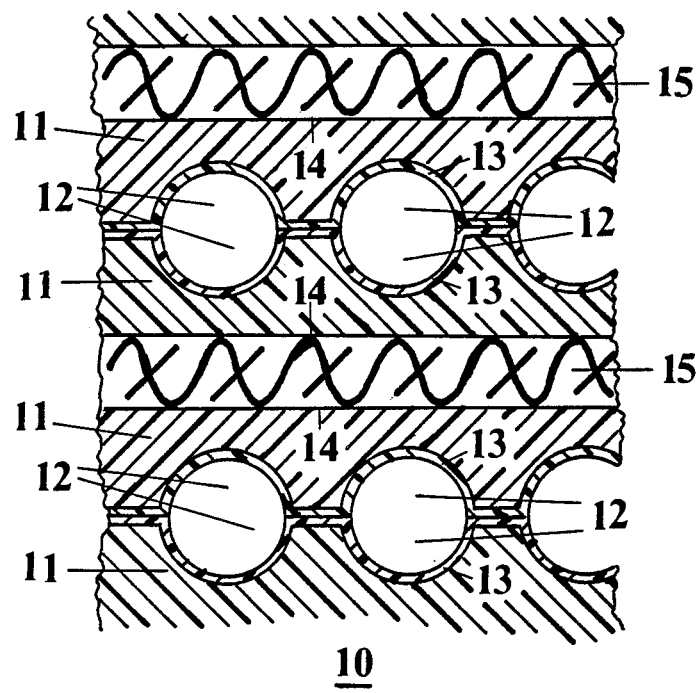
FIG. 1 illustrates a cross section of one configuration of the invention.

FIG. 1 illustrates a cross section of that configuration 10 of the invention, in which membranes 11 each have regularly spaced grooves 12 on one surface and barrier layers 13 on that surface of the membrane, which is intended to be in contact with the feed. When the system is in use, the feed passes through the feed channel, which is formed by the alignment and proximity of the two adjacent sets of grooves 12 on membranes 11. Separating the other non-grooved surfaces 14 of the stack of membranes is a permeate carrier cloth 15, which allows the permeate to flow out of the stack of membranes 11 in the design. In a less preferred variation of configuration 10, one of the membranes 11 in each pair can be replaced with a nonpermeable grooved sheet.

The configuration is conventional in the sense that two membrane sheets are placed face-to-face, but the feed channel spacer is not needed and is eliminated. This assembly can be made into a plate-and-frame filter by incorporating the appropriate manifolds or into a spiral-wound module by applying the appropriate sealer at the edges of the permeate channel.

In another embodiment, the feed channel grooves can be contained in one sheet and the feed channel can result from placing a planar (non-grooved) sheet in contact with it. This has the obvious advantage of not requiring the matching of the grooves between facing sheets during module assembly. For separations requiring a barrier layer on the membranes, the thin film barrier layer would be applied to only one side of the planar membrane and the front or grooved side of the other membrane. Alternatively, the feed channels could be coated after module assembly.

Figure 2:
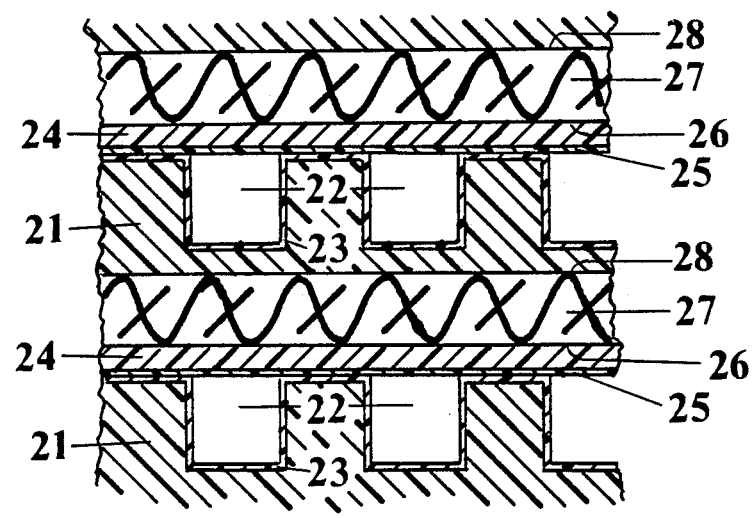
FIG. 2 illustrates a cross section of another configuration of the invention.

FIG. 2 illustrates a cross section of that configuration 20 of the invention, in which membranes 21 each have regularly spaced grooves 22 on one surface and barrier layers 23 on that surface of the membrane which is intended to be in contact with the feed. Covering the grooved side of each membrane 21 is a planar membrane sheet 24, having a barrier layer 25 on its side adjacent to membrane 21. When the system is in use, the feed passes through the feed channel, which results when the grooves 22 in membranes 21 are formed into "tunnels" by covering with planar membrane sheets 24. Separating the other surfaces 26 and 28 of the stack of membranes is a permeate carrier cloth 27, which allows the permeate to flow out of the stack of membranes in the design. In a less preferred variation of configuration 20, either membrane 21 or membrane 24 could be replaced with a non-permeable sheet of the same geometry. Flux density would be significantly reduced, but the other advantages would still be realized.

The order of elements 24, 21 & 27 in the stack could alternatively be 21, 24 & 27 as long as the grooved surface in membrane 21 always face membrane 24 surfaces forming the feed channels.

In a further embodiment, the sheets may instead be arranged with grooves for feed channels covered by the planar surface of a sheet with grooves on its other surface for a permeate channel which are parallel or perpendicular to the grooves of the sheet for the feed channels.

Figure 3A:
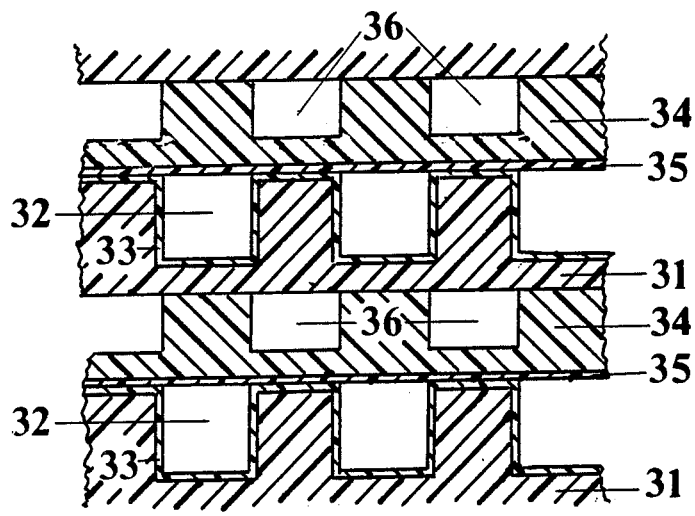
FIGS. 3a and 3b illustrate cross sections of two versions of another configuration of the invention.
Figure 3B:
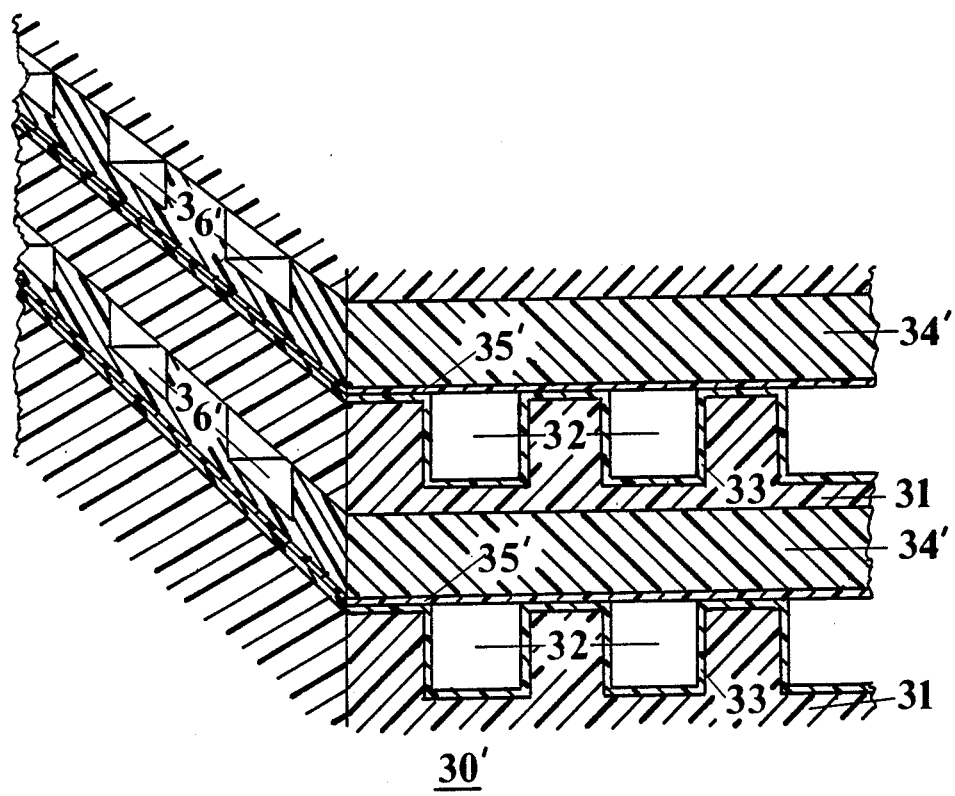

FIGS. 3a and 3b illustrate cross sections of those configurations 30 and 30' of the invention.

In FIG. 3a membranes 31 have regularly spaced grooves 32 on one surface and barrier layers 33 on that surface of the membrane, which is intended to be in contact with the feed. Covering the grooved side of each membrane 31 is another membrane sheet 34, having a barrier layer 35 on its planar side adjacent to membrane 31. When the system is in use, the feed passes through the feed channel, which results when the grooves 32 in membranes 31 are formed into "tunnels" by covering with the planar side of membrane sheets 34. On the other, nonplanar, side of membrane sheet 34 are grooves 36 intended for permeate, which allow the permeate to flow out of the stack of membranes in the design. Grooves 36 are aligned parallel to grooves 32. When the system is in use, the permeate passes through the permeate channels, which result when the grooves 36 in membranes 34 are formed into "tunnels" by covering with membrane sheets 31.

FIG. 3b shows a cross sectional cube in which membranes 31 have regularly spaced grooves 32 on one surface and barrier layers 33 on that surface of the membrane, which is intended to be in contact with the feed. Covering the grooved side of each membrane 31 is a another membrane sheet 34', having a barrier layer 35' on its planar side adjacent to membrane 31. When the system is in use, the feed passes through the feed channels, which result when the grooves 32 in membranes 31 are formed into "tunnels" by covering with planar membrane sheets 34'. On the other, nonplanar, side of membrane sheet 34' are grooves 36' intended for permeate, which allow the permeate to flow out of the stack of membranes in the design. Grooves 36' are aligned perpendicular to grooves 32. When the system is in use, the permeate passes through the permeate channels, which result when the grooves 36' in membranes 34' are formed into "tunnels" by covering with membrane sheets 31.

The designs of FIG. 3a and 3b require the use of two different grooved membranes. One, membrane 34, contains the grooves intended to be the permeate channels, and the other, membrane 31, contains the grooves intended to be the feed channel grooves. The solute rejecting barrier layer would only be coated on the planar backsides of membrane 34 and 34' and on the front grooved side of membrane 31.

The configuration depicted in FIG. 3b, in which the permeate channel grooves run perpendicular to the feed channel grooves, is preferred. In less preferred variations of configurations 30 and 30', either membrane 31 or 34, or either membrane 31 or 34' respectively could be replaced with a nonpermeable membrane sheet. Although flux density would be reduced, the nonfouling attribute of the membrane systems would persist.

In still another embodiment, the sheets contain grooves for feed channels on one surface and parallel or perpendicular grooves for a permeate channel on the other surface.

Figure 4:
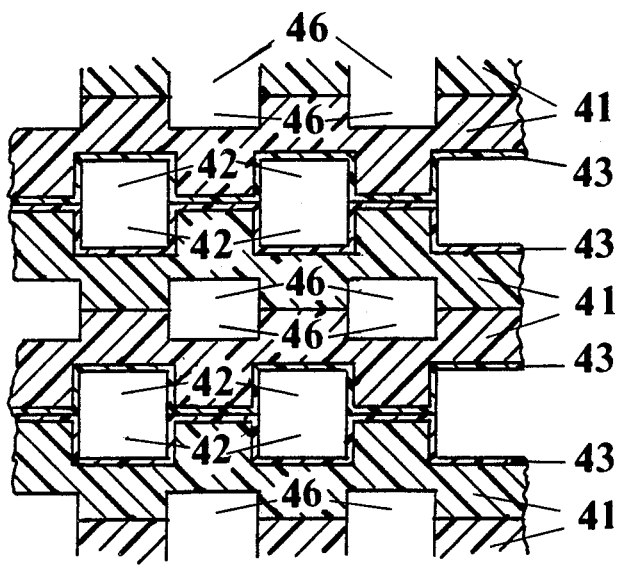
FIG. 4 illustrates a cross section of yet another configuration of the invention.

FIG. 4 illustrates a cross section of the parallel configuration 40 of the invention mentioned in the preceding paragraph, in which membranes 41 have regularly spaced grooves 42 on one surface and parallel grooves 46 on the other surface. Barrier layers 43 are applied to those surfaces of the membranes containing grooves 42 which are intended to be in contact with the feed. Two membrane sheets are placed face-to-face to form a sandwich. When the system is in use, the feed passes through the feed channel, which is formed by the alignment and proximity of the two adjacent sets of grooves 42 on membranes 41. On the other side of membrane sheets 41 are grooves 46 intended for permeate, which allow the permeate to flow out of the stack of membranes in the design. Sets of the membrane sandwich are then stacked so that grooves 46 are aligned. When the system is in use, the permeate passes through the permeate channels, which are formed by the alignment and proximity of the two adjacent sets of grooves 46 on membranes 41.

As in FIG. 3b, the parallel permeate channels depicted in FIG. 4 could be perpendicular to the feed channels; and this would probably be preferred. There would be added complexity in manufacturing a membrane with grooves on both sides. Again, only the sides of the membranes intended to form the feed channel would be coated with the solute-rejecting barrier layer. As with the other configurations, a less preferred variation of configuration 40 would have nonpermeable sheets in place of one of the permeable membrane sheets.

Figure 5:
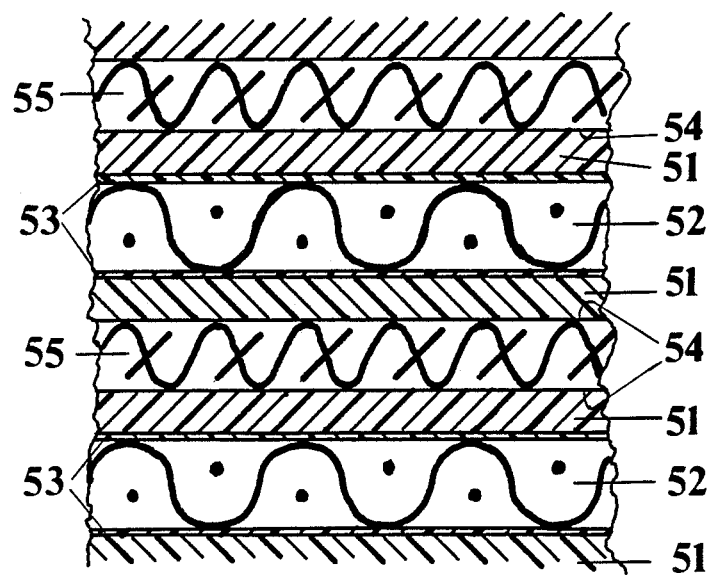
FIG. 5 illustrates the cross section of a conventional spiral-wound design for a reverse osmosis module.
Figure 6:
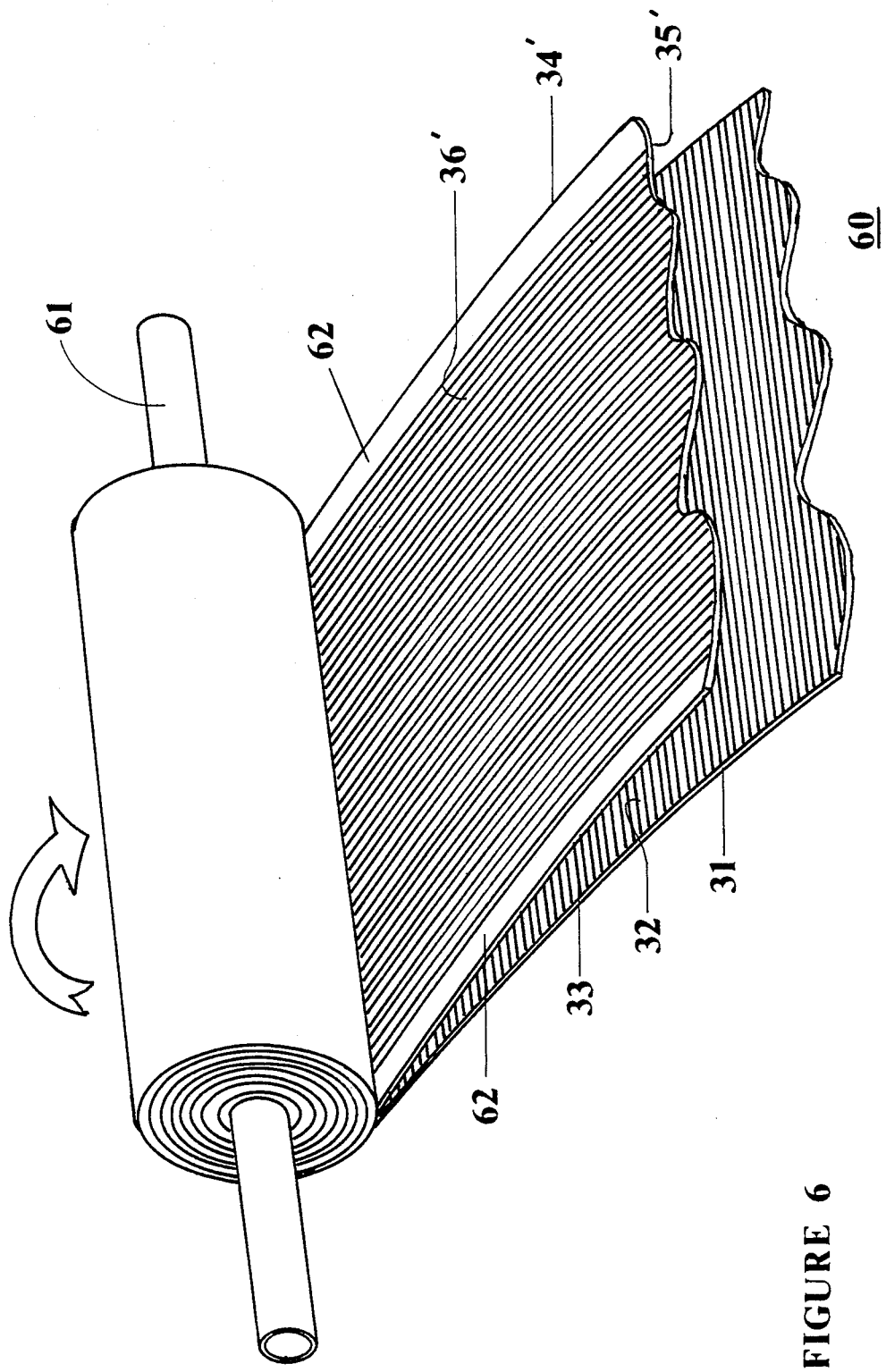
FIG. 6 illustrates a spiral-wound module prepared from a configuration having a cross section shown in FIG. 3b.

For comparison with FIG. 6, which illustrates a spiralwound module of the invention, FIG. 5 illustrates a cross section 50 of a conventional spiral-wound design, wherein membrane 51 has a barrier layer 53 on the side of the membrane intended to be in contact with the feed, which passes between the barrier layers 53 of two facing membranes 51. The feed channel is formed by feed channel spacer 52, which holds the two membranes apart a uniform distance. Separating the other surfaces 54 of the stack of membranes is a permeate carrier cloth 55, which allows the permeate to flow out of the stack of membranes in the design.

Membrane systems of the types illustrated in FIGS. 1 to 4 may easily be converted to spiral-wound designs. However, for the FIG. 3 configuration, the 3b version would be preferred for the perpendicular placement of the permeate and feed channel grooves. Similarly, for the FIG. 4 configuration, the version previously described having perpendicular placement of the permeate and feed channel grooves would be preferred.

FIG. 6 illustrates a spiral-wound module 60 prepared from a configuration having a cross section shown in FIG. 3b, in which membranes 31 have regularly spaced grooves 32 on one surface and barrier layers 33 on that surface of the membrane, which is intended to be in contact with the feed. Covering the grooved side of each membrane 31 is another membrane sheet 34', having a barrier layer 35' on its planar side adjacent to membrane 31. When the system is in use, the feed passes through the feed channel, which is formed by the grooves 32 in membranes 31 being formed into "tunnels" by covering with planar membrane sheets 34'. On the other, nonplanar, side of membrane sheet 34' are grooves 36' intended for permeate, which allow the permeate to flow out of the stack of membranes in the design. Grooves 36' are aligned perpendicular to grooves 32. When the system is in use, the permeate passes through the permeate channels, which result when the grooves 36' in membranes 34' are formed into "tunnels" by covering with membrane sheets 31.

Membrane leafs are constructed by placing membrane 34' on top of membrane 31, thereby covering the feed channels 32 and leaving the grooves 36' exposed until they are covered by being wound in the direction of the arrow under the planar bottom surface of membrane 31. An adhesive is placed between membranes 31 and 34' on the leading and trailing surfaces (although not shown these are relatively narrow surfaces on the ends parallel to permeate tube 61) and along the top perimeter 62 of membrane 34' (all four sides—only two of which are illustrated; the other two are parallel to the permeate tube 61) so that when the leaf is rolled onto the permeate tube 61 a seal is formed along the leading edge of membrane 34' to the permeate tube and on the outer edges between the grooved side of membrane 34' and the planar side of membrane 31. These seals prevent any direct contact of feed solution with the permeate channel. The only access is permeate passing through the barrier layers and the membranes. Rolling the membrane leaf(s) onto the permeate tube is performed so that the open grooves 36' of membrane 34' of the first wrap are in contact with the permeate tube. Perforations or slits (not visible in the view shown) in the permeate tube form an outlet for all of these grooves at some point during the first wrap. As in conventional constructions, more than one leaf may be used with the advantage of limiting the length of permeate channels. After the leaf(s) have been bonded and wound about the permeate tube, the module structure is completed by wrapping a plastic tape around its exterior.

Spiral-wound modules having cross sections as shown in FIGS. 1 or 2 would be assembled as described in U.S. Pat. No. 3,417,870 (D. T. Bray, Dec. 24, 1968) except that no feed spacer would be required or used between the membrane surfaces which form the feed channels.

In practice the spiral-wound element is placed in a tubular pressure vessel provided with seals (between the element and vessel) and end caps with connections for feed and product streams. The feed stream enters one end of the tubular vessel under pressure, flows through the feed channels of the element parallel to the permeate tube and across the active membrane surface, and is prevented from bypassing the membrane element by seals. The concentrated stream exits the feed channels and the end cap on the other end of the vessel. The permeate which passes through the membrane flows in a perpendicular direction through the permeate channels (or permeate carrier cloth) from the outer circumference of the element to the perforated permeate tube. The permeate then exits the tube which extends through at least one of the endcaps.

The membrane sheets may be formed by casting, extruding or polymerizing onto a surface containing ridges corresponding to the shape and dimensions of the desired grooves in the membrane sheets.

The casting may be conducted to result in an integral barrier layer on the surfaces having grooves for feed channels. Alternatively, the permeable membrane sheets may have a separately applied coating of a barrier layer on the surfaces having grooves for feed channels. The latter are called composite membranes.

One method of casting the membranes is by wet casting using the phase inversion process as is generally described by Kesting [Robert E. Kesting, "Synthetic Polymeric Membranes", John Wiley & Sons, New York, (1985), pp. 251–260].

The inclusion of pore forming materials in order to form pores in the membranes is well known from, e.g., E. K. L. Lee, W. C. Babcock, R. P. Barss, P. A. Bresnahan and M. S. Chidlaw, "Novel Composite Membranes", OWRT Contract #DI-14-34-0001-1449 to Bend Research, Inc., available from NTIS, Report #PB83-243170; L. T. Rozelle, J. E. Cadotte, R. D. Corneliussen and E. E. Erickson, "Development of New Reverse Osmosis Membranes for Desalination", OWRT Contract #DI-14-01-0001-1143 to North Star Research and Development Inst., available from NTIS, Report #PB-203-329; and R. L. Riley, G. R. Hightower, C. R. Lyons, C. E. Milstead and M. W. Milroy, "Research and Development on a Spiral-Wound Membrane System for Single-Stage Seawater Desalination", OWRT Contract #DI-14-30-3191 to UOP, Inc., Fluid Systems Division, available from NTIS as Report #PB81-151953. However, care should be taken to avoid conditions which result in large formations of macrovoids especially those which protrude to the lower surface of the membrane.

The addition of certain polymers also accomplishes the pore forming in what has been called a polymer-assisted phase-inversion process by Kesting in the aforementioned reference (p. 264). A preferred polymer is polysulfone. Udel ® polysulfone from Union Carbide or Victrex ® polyether sulfone from ICI America are suitable examples and have been used by many others for this purpose. Other suitable polymers include cellulose esters, polystyrene, polyvinyl butyral, chlorinated polyvinyl chloride, polyvinylidene fluoride, diphenylolpropane polycarbonate, polymethyl methacrylate, or poly(m-phenylene isophthalamide) and the like. A fabric support may also be included.

An alternative process is to use a thermal phase inversion technique recently described by Anthony J. Castro in U.S. Pat. No. 4,247,498, Jan. 27, 1981.

This technique would be preferable for making membrane sheets with an integral barrier layer because a dense skin can form on the casting, i.e., grooved surface. (This is not the case for the wet casting method, where the dense skin, if formed, is on the opposite surface, i.e., the side away from the casting plate.) The thermal phase-inversion process utilizes a latent solvent, which is a solvent at a higher temperature and becomes a nonsolvent at a lower temperature. The process is applicable to many polymers and is particularly suited to those polymers which, because of their low solubility, are not suitable for the wet casting approach. Examples of these are the polyolefins. Examples of suitable polymers and appropriate solvents are given in U.S. Pat. No.

4,247,498 and include polypropylene with N,N-bis(2-hydroxyethyl)tallowamine, low density polyethylene with 1-octanol, polymethyl methacrylate with 1,4-butanediol, and the like. This process has also recently been described by Caneba and Soong using polymethyl methacrylate and dioxolane solvent [G. T. Caneba and D. S. Soong, "Polymer Membrane Formation—Thermal-Inversion Process. I. Experimental Study of Membrane Structure Formation", *Macromol.*, 18, (1985), 2538; and G. T. Caneba and D. S. Soong, "Polymer Membrane Formation—Thermal-Inversion Process. II. Mathematical Modeling of Membrane Structure Formation", ibid., 2545].

Another method to form the membrane sheets of this invention would be to thermally form the grooves in sheets containing extractable salts. Melt extrusion of a mixture of polyvinyl chloride and micronized sodium chloride may be used for this purpose [B. Baum, R. A. White and J. Labis, "Development of Porous Polyvinyl Chloride Coated Tubulets for Seawater Desalination", OWRT Contract #DI-14-30-3250 to DeBell and Richardson, Inc., available from NTIS, Report #PB-243 278/9].

Another optional process for preparing the membranes of the invention would be to polymerize and crosslink a solution of monomers in the presence of a nonreactive solvent to produce a microporous structure. An example of this technique may be found in a recent patent assigned to Gelman Sciences Technology Ltd. [G. B. Tanny, "Method for Manufacturing Microporous Membrane", U.S. Pat. No. 4,466,931, Aug. 5, 1982.]

For applications of reverse osmosis, gas separation, and liquid-liquid separations, a barrier layer will normally have to be applied to those surfaces making up the feed channel. Most of the known methods can be used and as described on page 277 in the referenced text by Kesting include: application of a preformed polymer or prepolymer solution directly onto the porous support followed by drying or curing; interfacial polycondensation of reactive monomers on the surface of the membrane; lamination of a separately cast ultra thin film; and plasma polymerization of suitable monomers onto the membrane surface. Only the first two methods however, have achieved any practical significance.

An example of the first method is the application of a polyethyleneimine prepolymer as a dilute aqueous solution to the surface of the membrane followed by a subsequent reaction with toluene diisocyanate in a hexane solution to form a crosslinked polyurea and finally thermal curing to result in what is known as the NS-100 membrane [J. E. Cadotte, "Reverse Osmosis Membrane", U.S. Pat. No. 4,039,440, Aug. 2, 1977, and L. T. Rozelle, J. E. Cardotte, K. E. Cobian and C. V. Kopp, "Nonpolysaccharide Membranes for Reverse Osmosis: NS-100 Membranes", S. Sourirajan, Ed., National Research Council Canada, Ottawa, Ontario, Canada, (1977), 249-261].

An example of the second method is the formation of an interfacial polymer by the application of a dilute aqueous solution of m-phenylene diamine to the membrane surface followed by contact with a hexane solution of trimesoyl chloride. A lightly crosslinked aromatic polyamide coating results, yielding what is known as the FT-30 membrane, which has been described in U.S. Pat. No. 4,277,344, J. Cadotte, 1981.

The barrier layer can be applied in one of several ways. First, it can be applied to the suitable membrane surfaces prior to the assembly of the membrane element. Secondly, the coating can be applied to the feed channels after assembly of the element in a manner similar to that employed by workers at Bend Research, Inc. to coat the inside of hollow-fibers after module assembly. A useful modification might be to apply the prepolymer or one of the reactive monomers prior to module assembly and to perform the polymerization or curing after module assembly. Another method described on page 281 of the Kesting reference, as the reverse sequence, would be to form the thin film prior to formation of the microporous support. Two methods are described: first, where the thin film is formed on the casting substrate prior to casting of the membrane support, and second, where the thin film is formed on a microporous membrane precursor which is ultimately formed (after coating with the thin film) by extraction or leaching of certain components present during the casting of the membrane support.

There are many variations possible regarding the spacing of the grooves, their size and their shape. The trade-offs will be to maximize the membrane surface area, minimize concentration polarization and fouling, minimize pressure drops, maintain structural integrity and simplify manufacturing.

The shape of the cross section of the channel will in part be dictated by the type of assembly. Thus a circular cross section is possible with the type depicted in FIG. 1, but would be very difficult with the other types. It is assumed that a circular cross section would be ideal and that as close to circular as possible would be the best.

The size of the feed channel cross section will depend only on the thickness of the membrane and what is optimum for the flow requirements, i.e., flow velocity and minimal pressure loss. The actual surface area of a membrane as seen by the feed channel, for a given membrane sheet will be independent of cross section size provided that the spacing of the channels is a function of the cross section width or diameter. Thus, for square cross sections, the area of membrane surface in the feed channels is given by the following expression:

$$\text{Surface Area} = 4WL/F$$

where: $W$=width of area with grooves, $L$=length of membrane, and $F$=spacing factor ($F=2$ where spacing is twice the width of the cross sections and $F=3/2$ where spacing is 3/2 the width of the cross sections)

For circular cross sections, the formula is:

$$\text{Area} = \pi WL/F$$

where $W$, $L$, $F$ have the same meanings as above. Similar formulas can be derived for other shapes of cross sections.

The determining factors in establishing the feed channel surface area in a module will thus be the combined thicknesses of membranes, and permeate cloth if used, to form 1 layer of feed and permeate channels, and the spacing between the feed channels. The surface area of membrane in the feed channel per cubic foot of module (packing density) is then given by:

$$\text{Area per cu.ft.} = (S/F)(12,000/T)$$

where: $S$=shape factor (circle=$\pi$, square=4), $F$=spacing factor; $T$=thickness in mils of membranes (and cloth) in 1 layer of feed and permeate channels.

The greatest interest for reverse osmosis will be using about 20 mil grooves at spacing factors between 1.5 and 2. This results in packing densities between 500 and 1000 ft²/ft³. Smaller channels such as might be appropriate in gas separations can obviously lead to much larger packing densities.

A further feature of the design of the invention not easily attained with the prior art systems would be to use tapered grooves. Decreased velocity of flow in the upstream end of modules leads to increased fouling and concentration polarization. This is easily understood in the practical situation where conversion of feed to permeate is high (30 to 75%). Writing about ultrafiltration, A. Michaels has stated: "Probably the most serious limitation is the inescapable problem of permeation flux depression by solute polarization at the upstream membrane surfaces. This phenomenon causes a 10-fold or greater reduction in membrane hydraulic permeability relative to the measured purewater permeation rate, along with a marked negative dependence of permeability on the concentration of retained solutes in the upstream field." [A. Michaels, "Ultrafiltration: An Adolescent Technology," *Chemtech*, January 1981, 36–43.] Grooves tapered down to the exit side could be tailored to have flow velocity constant for a given conversion. For example, with square cut grooves, the changes indicated in Table 2 would provide for constant flow velocity at the stated conversions.

TABLE 2

Taper of Grooves for Different Conversions (Square Cross Sections)

| % Conversion | Dimensions (mil) | | Areas (mil²) | |
| --- | --- | --- | --- | --- |
| | Entrance | Exit | Entrance | Exit |
| 30 | 10 | 8.4 | 100 | 70 |
| 30 | 20 | 16.8 | 400 | 280 |
| 50 | 10 | 7.1 | 100 | 50 |
| 50 | 20 | 14.1 | 400 | 200 |
| 70 | 10 | 5.5 | 100 | 30 |
| 70 | 20 | 11.0 | 400 | 120 |

The membrane systems of the invention may be used for the separations mentioned herein.

Generally, the invention also comprises a process for the separation of one component from a mixture comprised of at least two components which comprises applying sufficient pressure to the mixture to cause one component to pass through a permeable membrane system comprised of at least two permeable membrane sheets, at least one of the two sheets having regularly spaced grooves on at least one surface, the sheets being positioned in a configuration with the grooves on the surface of one sheet forming feed channels with a surface of the covering sheet, thereby resulting in a solvent-rich permeate stream enriched in one component and a residual stream enriched in the remaining components of the original mixture.

Preferably, the process utilizes the preferred embodiments of the membrane system mentioned herein.

More particularly, the invention comprises a process for reverse osmosis separation of solvent from a solution comprised of a solvent and a solute which comprises applying sufficient pressure to the solution to overcome the osmotic pressure of the solution and thereby cause the solvent to pass through a permeable membrane system comprised of at least two permeable membrane sheets, at least one of the two sheets having regularly spaced grooves on at least one surface, the sheets being positioned in a configuration with the grooves on the surface of one sheet forming feed channels with a surface of the covering sheet, thereby resulting in a solvent-rich permeate stream and a solute-rich residual stream.

There are several advantages to the invention. Module properties for the invention in reverse osmosis, which show these advantages, are listed in Table 3 along with the properties of the high flux-density modules previously listed in Table 1.

TABLE 3

Comparison of Properties For The Invention In Reverse Osmosis

| Property | Spiral-Wound | Hollow-Fiber | | Invention |
| --- | --- | --- | --- | --- |
| | | Shell-Fed | Tube-Fed | |
| Packing Density (ft²/ft³) | 300 | 4000 | 400 | 500–1000 |
| Permeate Flux (gal/ft²/day) | 20 | 3 | 10 | 20 |
| Flux Density (gal/ft³/day) | 6000 | 12000 | 4000 | 10000–20000 |
| Conversion/Lineal Ft. | Moderate | High | Moderate | Moderate |
| Surface Area/Feed Channel Volume (ft²/in³) | 0.28 | 3.6 | 2.8 | 0.83–2.5 |
| Parasitic Pressure Loss | Low | High | Moderate | Low |
| Concentration Polarization | Moderate | High | Low | Low |
| Fouling | Moderate | High | Low | Low |
| Prefiltration Requirement | Extensive | Extensive | Minimal | Minimal |
| Module Cost | ← Inexpensive → | | Moderate | Inexpensive |

The following combination of properties should make the invention the configuration of choice for most separations and especially for feed streams with significant concentrations of suspended matter.

Flux density equivalent to or higher than shell-fed hollow-fiber modules.

Low fouling compared to the readily fouled conventional spiral-wound and hollow-fiber modules and probably better than the tube-fed hollow-fiber module as well.

Minimal prefiltration requirement.

A module cost per volume of water processed less than any of the other modules.

A more detailed discussion of the properties in reverse osmosis applications follows:

The packing density of the invention will be primarily a function of the feed channel membrane thickness and groove spacing. However, it is expected that the density will easily exceed that of the conventional spiral-wound and the tube-fed hollow-fiber modules, but never achieve that of the shell-fed hollow-fiber module. For instance, using a feed channel membrane 25 mil thick, a permeate channel membrane 15 mil thick, 20 mil wide grooves, and a spacing factor of 2, the packing density will be 600. Changing the spacing factor to 3/2 will result in a density of 800. These numbers will be reduced slightly by the volume of the permeate tube (ca. 7%).

Flux should approximate the maximum attainable, should easily be equivalent to that achieved in flat membrane sheets, and could exceed that observed in spiral-wound modules. A number of 20 gfd is used, which is easily achieved with composite membranes at 400 psi, and is consistent with the numbers used in Table 1.

Using tapered channels, the flux at high conversions could exceed that observed for any other system.

Flux density should exceed that of all other systems.

Surface Area/Feed Channel Volume for the 20 mil grooves is clearly better than the spiral-wound system and not quite as good as the tube-fed hollow-fiber system. However, the higher flux will result in comparable conversions per lineal foot.

The parasitic pressure loss should be low compared to either of the hollow-fiber types, and probably equivalent to other spiral-wound configurations.

Concentration polarization should be less than for the other high density systems. This is a result of two factors—the absence of dead spots caused by protrusions in the feed channel and the relatively large size channels.

Fouling is also expected to be less than for any of the other high density systems for the same reasons stated above. Evidence that this should be true lies in the work carried out at Bend Research for reverse osmosis with tube-fed hollow-fiber modules. Their modules contain lumens of about 10 mil in diameter, and were shown to behave in a superior manner to a conventional spiral wound module. However, the lumen size of their modules is limited by the requirements for hoop strength—a requirement not present in this invention. It is expected that grooves about 20 mil in width will be superior in non-fouling properties to their tube-fed hollow-fiber system. The performance of the systems of the invention should approximate that of the plate-and-frame and tubular systems, and should permit the handling of "dirty" separations. The positive flow of feed should also permit easy and effective cleaning.

Prefiltration requirements for the tubular modules are minimal, which has been a deciding factor in their application to "dirty" separations. The spiral-wound units require extensive prefiltration to prevent rapid fouling, and the shell-fed hollow-fiber modules are the worst in terms of fouling. As noted above, the large lumen tube-fed hollow-fiber modules being developed by Bend Research appear to require minimal prefiltration and the same should be true for the present invention.

Cost on a square foot basis of active membrane of the invention is expected to be less than that for the spiral-wound membrane. It is roughly estimated that per square foot of membrane material the costs may be 50% higher. However, because there will be at least twice as much surface area per square foot of material, the costs on an active membrane area basis will be at least 25% less.

The additional savings on pretreatment costs over the other "low cost" systems should give the invention a clear advantage.

The invention also comprises a process for ultrafiltration of liquid from a mixture comprised of a liquid and either a large molecular weight solute or suspended particles or both which comprises applying sufficient pressure to the mixture to cause the liquid to pass through a permeable membrane system comprised of at least two permeable membrane sheets, at least one of the two sheets having regularly spaced grooves on at least one surface, the sheets being positioned in a configuration with the grooves on the surface of one sheet forming feed channels with a surface of the covering sheet, thereby resulting in a liquid-rich permeate stream and a residual stream enriched in the remaining components of the mixture.

The invention further comprises a process for the separation of one gas from a mixture comprised of at least two gases which comprises applying sufficient pressure to the mixture to cause a measurable flux of at least one gas through a permeable membrane system comprised of at least two permeable membrane sheets, at least one of the two sheets having regularly spaced grooves on at least one surface, the sheets being positioned in a configuration with the grooves on the surface of one sheet forming feed channels with a surface of the covering sheet, thereby resulting in a permeate stream enriched in one gas and a residual stream enriched in the remaining gases of the original mixture.

The invention still further comprises a process for liquid-fluid separation of the fluid from a mixture of (a) a liquid and (b) a fluid which is either a liquid or a gas, which process comprises applying sufficient pressure to the solution to overcome the osmotic pressure of the solution and thereby cause the fluid to pass through a permeable membrane system comprised of at least two permeable membrane sheets, at least one of the two sheets having regularly spaced grooves on at least one surface, the sheets being positioned in a configuration with the grooves on the surface of one sheet forming feed channels with a surface of the covering sheet, thereby resulting in a permeate stream rich in fluid (b) and a residual stream enriched in liquid (a).

The invention still further comprises a continuous process for separating product from fluid reactants and catalyst in a reactor system wherein the catalyst is attached or immobilized onto a permeable membrane or an adjacent surface or is recirculated with reactants across the surface of the permeable membrane and the separation is effected by the ability of the product to selectively pass through a permeable membrane system comprised of at least two permeable membrane sheets, at least one of the two sheets having regularly spaced grooves on at least one surface, the sheets being positioned in a configuration with the grooves on the surface of one sheet forming feed channels with a surface of the covering sheet, thereby resulting in a product-rich permeate stream and a reactant-rich residual stream, which is recirculated through the reactor with additional reactants.

The following examples describe the manner and process of making and using the invention and set forth the best mode contemplated for carrying out the invention, but are not to be construed as limiting.

EXAMPLE I

Microporous Membrane Preparation

A casting solution comprising 20% (wt./wt.) of Victrex ® polyethersulfone (ICI Americas - Grade 4800P), 16% (wt./wt.) 2-methoxyethanol, commonly known as methylcellosolve (Aldrich Chemical Co.), and 1% (wt./wt.) 2,4-diamino-6-phenyl-S-triazine (Eastman Kodak Co.) is mixed with 63% (wt./wt.) N,N-dimethylacetamide (DMAc) (J. T. Baker Chemical Co.) with agitation and mild heat until dissolved. The resulting solution is filtered and deaerated of entrained bubbles by allowing it to stand in a closed container overnight at room temperature.

A continuous grooved membrane sheet is prepared by casting the polyethersulfone solution onto a grooved roll using a doctor knife set at a 10 mils clearance between knife edge and roll surface. The grooved roll is 12 inches in diameter and 48 inches in length and has circumferential grooves 20 mil wide and 20 mils deep cut into the roll surface and spaced 20 mils apart. The grooved roll is partially immersed (½ the roll) in a coagulating bath for the polyethersulfone consisting of 50/50 (wt./wt.) DMAc/H₂O at room temperature. The grooved roll rotates at a circumferential speed of approximately 4 inches/min, thus providing for an immersion or coagulating time of about 5 minutes. The wet, coagulated, grooved film is continuously withdrawn from the roll and coagulating bath and passes through a series of additional baths of 25/75 and 10/90 DMAc/H₂O, and 100% water for final washing to remove residual DMAc solvent and then dried continuously in a drying chamber to remove water. In a similar manner, a planar membrane sheet is prepared using a smooth roll in place of the grooved roll. The total membrane thicknesses of the grooved sheet and of the planar sheet are approximately 25 and 5 mils respectively.

EXAMPLE II

Reverse Osmosis Membrane Preparation

The grooved side of the dried membrane from the previous example is coated with an 0.3% aqueous solution of polyethyleneimine (Epomin® P1000) (Aceto Chemical Co.) and 10% of polyoxyethylene glycol (Carbowax® PEG - 6000). It is subsequently coated with an 0.15% solution of toluene-2,4-diisocyanate (Aldrich Chemical Co.) in hexane. The interfacially polymerized coating is cured for 15 min at 115° C. Although ideally this process can be carried out continuously, in this example it is done batchwise with appropriately sized sheets. Sheets 20 inches in width and 48 inches long are cut from the coated continuous membrane sheet so that the grooves run perpendicular to the length of the resulting sheet. In a similar manner, the planar membrane prepared in Example I is also coated.

EXAMPLE III

Reverse Osmosis Spiral-Wound Module

Sheets of the thin film coated membranes from Example II are fabricated into a reverse osmosis element as follows. A porous resin impregnated tricot product channel material, commonly known as permeate carrier cloth (Resource Technology, Inc.) is first attached to a perforated hollow mandrel tube with an adhesive. The membrane sandwich consisting in this instance of a 42 inch by 20 inch sheet of the grooved membrane and a similar size sheet of smooth membrane with the coating or active membrane surfaces of the two sheets facing one another is placed on the tricot so that the grooves are parallel to the mandrel. Polyurethane adhesive (UR2166 - H. B. Fuller Co.) is applied between the leading edges of the membranes and to the back (nonactive) side of both membranes along the long edges and the edge of the trailing short sides of the membranes. The element is then rolled up by rotating the mandrel to form the spiral wound element with alternating layers of tricot and membrane sandwich. The exterior of the element is then wound with a layer of plastic tape over the membrane surface. After the adhesive has cured (overnight at room temperature), it is then ready for test and use in reverse osmosis. The ends of the spiral wound element are trimmed to the mandrel surface to expose the feed channel edges and sealed edges of the product channel. The sealed envelope of the membrane sandwich thus allows for product flow to the mandrel tube without communicating with the feed flow from the exposed ends of the grooved channels. The device has a total of about 10 square feet of membrane.

To form a prior art membrane system, a similar 10 square foot spiral-wound element is fabricated in a like manner from two planar membrane sheets except that a plastic netting (Vexar®) is placed between the membrane sandwich so that the netting is between the active layers of the two membrane sheets. The netting thus functions to provide for feed channel flow across the membrane's active surfaces.

EXAMPLE IV

Reverse Osmosis Module Demonstration

The two spiral-wound elements of the previous example are placed in separate tubular pressure vessels provided with mandrel seals and end caps and with connections for feed and product streams.

The grooved and the planar spiral-wound elements are tested simultaneously for fouling resistance by arranging the two pressure vessels containing the respective spiral-wound elements in a parallel flow configuration in a pressure flow test apparatus. The units are tested with a 0.5% (wt./wt.) solution of sodium chloride in water containing 3000 ppm of suspended kaolin clay. The feed rates are adjusted to give a linear flow rate of 0.5 meters/sec. (1.5 ft/sec) to each module based on the dimension of the feed channel spacings.

Initial measurements at 400 psi indicate a flux or product flow of about 15 gfd and 95% rejection for both modules. However, over a 24 hour period, the spiral-wound planar membrane module tends to foul as shown by a large drop in flux and rejection. By contrast, the grooved membrane module exhibits essentially no change in performance. Thus the efficiency of grooved membranes to fouling is demonstrated.

EXAMPLE V

Ultrafiltration Module and Demonstration

A spiral-wound element is made in the same manner as in Example III except that the uncoated microporous membrane sheets from Example I are used. The element is placed in a tubular pressure vessel provided with mandrel seals and end caps and with connections for feed and product streams.

The unit is tested at 50 psi with an aqueous solution containing 1000 ppm of sodium chloride and 200 ppm polyoxyethylene glycol of 6000 molecular weight. At a feed rate of about 75 gal/hr., the initial flux will be about 600 gal/day (60 gal/ft²/day). The rejection of sodium chloride will be about 0% and the rejection of polyoxyethylene glycol will be about 80%.

EXAMPLE VI

Gas Separation Membranes For Oxygen Enrichment

A continuous grooved polyethersulfone membrane sheet and a planar membrane sheet are made as described in Example I except that the grooved roll contains circumferential grooves 5 mils wide and 5 mils deep and spaced 5 mils apart, and the doctor knife is set at a clearance of 5 mils between the knife edge and roll surface.

One surface of the dried planar membrane and the grooved surface of the dried grooved membrane sheet, which surfaces together comprise the feed channels, are passed through a trifluorotrichloroethane solvent containing 1.5 wt. % of dimethyl silicone and 0.15 wt. % of a crosslinking agent comprising dibutyl tin dilaurate. The process is described in U.S. Pat. No. 4,243,701. The membranes are passed through said solution at ambient temperature and atmospheric pressure and are withdrawn at a rate of 4 cm/sec. Thereafter the dimethyl silicone is cross-linked by treatment at a temperature of 120° C. for a period of 0.25 hour to form a thin polymeric film integrally bonded to the supporting membrane, said thin polymeric film having a thickness of about 5000 Angstroms.

EXAMPLE VII

Gas Separation Module and Demonstration

A spiral-wound module is made using the membrane sheets from Example VI by the same procedure used in Example III. The element is then used in a single-stage gas-separation process. A feed stream comprising air is passed over the surface of this membrane at a pressure of 150 psi at 25° C. The membrane exhibits a higher permeability to oxygen than to nitrogen, and the permeate stream, which passes through the membrane, is enriched in oxygen, while the residue stream, which consists of the remainder of the unpermeated stream, is enriched in nitrogen. It is possible to attain oxygen enrichments of the permeate stream to as high as 35%.

What is claimed is:

1. A permeable membrane system comprised of at least two sheets, at least one of the two sheets being a grooved permeable membrane having regularly spaced grooves on at least one surface, said grooves having a predetermined spacing factor, the grooved permeable membrane either having essentially no barrier layer or having a barrier layer on one grooved surface, the sheets being positioned in a configuration with the grooves on the said one grooved surface of the grooved permeable membrane sheet forming feed channels with a surface of another sheet which covers the said one grooved surface, said grooves being about 0.5 to about 100 mils wide and deep and said feed channels being used to deliver the feed stream to the membrane surface.

2. A permeable membrane system as claimed in claim 1 wherein the grooves are about 0.5 to about 20 mils wide and deep.

3. A permeable membrane system as claimed in claim 1 wherein the grooves are about 5 to about 35 mils wide and deep.

4. A permeable membrane system as claimed in claim 1 wherein the grooves are about 15 to about 75 mils wide and deep.

5. A permeable membrane system as claimed in claim 1 wherein the grooves are tapered down to the exit side.

6. A permeable membrane system as claimed in claim 1 wherein the grooved membrane sheets are positioned so that the grooves in one sheet are aligned with the grooves in an adjacent sheet, whereby the grooves in one sheet form parts of the feed channels and the corresponding grooves of the other sheet form the other parts of the feed channels.

7. A permeable membrane system as claimed in claim 1 wherein the grooved membrane sheets are alternated with planar sheets so that the grooves of the grooved membrane sheets form the feed channels with the adjacent surface of a planar sheet.

8. A permeable membrane system as claimed in claim 1 wherein the permeable membrane sheet with grooves for feed channels is covered by the planar surface of a membrane with grooves on its other surface for a permeate channel which are parallel to the grooves of the membrane for the feed channels.

9. A permeable membrane system as claimed in claim 1 wherein the permeable membrane sheet with grooves for feed channels is covered by the planar surface of a membrane with grooves on its other surface for a permeate channel which are perpendicular to the grooves of the membrane for the feed channels.

10. A permeable membrane system as claimed in claim 1 wherein at least one of the permeable membrane sheets contains grooves for feed channels on one surface of the membrane and parallel grooves for a permeate channel on the other surface of the membrane.

11. A permeable membrane system as claimed in claim 1 wherein at least one of the permeable membrane sheets contains grooves for feed channels on one surface of the membrane and perpendicular grooves for a permeate channel on the other surface of the membrane.

12. A permeable membrane system as claimed in claim 1 wherein there are at least two permeable membrane sheets and each pair of membrane sheets is separated from other membrane sheets by a permeate carrier cloth.

13. A permeable membrane system as claimed in claim 1 wherein the configuration is of the plate-and-frame type.

14. A permeable membrane system as claimed in claim 1 wherein the configuration is of the spiral-wound type.

15. A permeable membrane system as claimed in claim 1 wherein at least one of the permeable membrane sheets is a cast or extruded membrane having an integral barrier layer on the surface having grooves for feed channels.

16. A permeable membrane system as claimed in claim 1 wherein at least one of the permeable membrane sheets is a cast or extruded membrane having a coating of a barrier layer on the surface having grooves for feed channels.

17. A permeable membrane system as claimed in claim 1 wherein the membrane is formed from a polysulfone, polyether sulfone, cellulose ester, polystyrene, polyvinyl butyral, or chlorinated polyvinyl chloride, polyvinylidene fluoride, diphenylolpropane polycarbonate, poly(methylmethacrylate) or poly(m-phenylene isophthalamide.

18. A permeable membrane system as claimed in claim 1 wherein the membrane has a coating of cross-linked polyurea or aromatic polyamide as a barrier layer.

19. A process for the separation of one component from a mixture comprised of at least two components which comprises applying sufficient pressure to the mixture to cause one component to pass through a permeable membrane system comprised of at least two permeable membrane sheets, at least one of the sheets having regularly spaced grooves on at least one surface, said grooves having a predetermined spacing factor, the sheets being positioned in a configuration with the grooves on one grooved surface of one sheet forming feed channels with a surface of another sheet which covers the said one grooved surface, said grooves being about 0.5 to about 100 mils wide and deep and said feed channels being used to deliver the feed stream to the membrane surface, thereby resulting in a solvent-rich permeate stream enriched in one component and a residual stream enriched in the remaining components of the original mixture.

20. A process as claimed in claim 19 wherein the grooves are tapered down to the exit side.

21. A process as claimed in claim 19 wherein the grooved membrane sheets are positioned so that the grooves in one sheet are aligned with the grooves in an adjacent sheet, whereby the grooves in one sheet form parts of the feed channels and the corresponding grooves of the other sheet form the other parts of the feed channels.

22. A process as claimed in claim 19 wherein the grooved membrane sheets are alternated with planar sheets so that the grooves of the grooved membrane sheets form the feed channels with the adjacent surface of a planar sheet.

23. A process as claimed in claim 19 wherein the permeable membrane sheet with grooves for feed channels is covered by the planar surface of a membrane with grooves on its other surface for a permeate channel which are parallel to the grooves of the membrane for the feed channels.

24. A process as claimed in claim 19 wherein the permeable membrane sheet with grooves for feed channels is covered by the planar surface of a membrane with grooves on its other surface for a permeate channel which are perpendicular to the grooves of the membrane for the feed channels.

25. A process as claimed in claim 19 wherein at least one of the permeable membrane sheets contains grooves for feed channels on one surface of the membrane and parallel grooves for a permeate channel on the other surface of the membrane.

26. A process as claimed in claim 19 wherein at least one of the permeable membrane sheets contains grooves for feed channels on one surface of the membrane and perpendicular grooves for a permeate channel on the other surface of the membrane.

27. A process as claimed in claim 19 wherein there are at least two permeable membrane sheets and each pair of membrane sheets is separated from other membrane sheets by a permeate carrier cloth.

28. A process as claimed in claim 19 wherein the membrane is formed from a polysulfone, polyether sulfone, cellulose ester, polystyrene, polyvinyl butyral, or chlorinated polyvinyl chloride, polyvinylidene fluoride, diphenylol propane polycarbonate, poly(methylmethacrylate) or poly(m-phenylene isophthalamide).

29. A process as claimed in claim 19 wherein the membrane has a coating of crosslinked polyurea or aromatic polyamide as a barrier layer.

30. A process as claimed in claim 19 wherein the configuration is of the plate-and-frame type.

31. A process as claimed in claim 19 wherein the configuration is of the spiral-wound type.

32. A process for reverse osmosis separation of solvent from a solution comprised of a solvent and a solute which comprises applying sufficient pressure to the solution to overcome the osmotic pressure of the solution and thereby cause the solvent to pass through a permeable membrane system comprised of at least two permeable membrane sheets, at least one of the two sheets having regularly spaced grooves on at least one surface, said grooves having a predetermined spacing factor, the sheets being positioned in a configuration with the grooves on one grooved surface of one sheet forming feed channels with a surface of another sheet which covers the said one grooved surface, said grooves being about 5 to about 35 mils wide and deep and said feed channels being used to deliver the fed stream to the membrane surface, thereby resulting in a solvent-rich permeate stream and a solute-rich residual stream.

33. A process as claimed in claim 32 wherein at least one of the permeable membrane sheets is a cast or extruded membrane having an integral barrier layer on the surface having grooves for feed channels.

34. A process as claimed in claim 32 wherein at least one of the permeable membrane sheets is a cast or extruded membrane having a coating of a barrier layer on the surface having grooves for feed channels.

35. A process for ultrafiltration of liquid from a mixture comprised of a liquid and either a large molecular weight solute or suspended particles or both which comprises applying sufficient pressure to the mixture to cause the liquid to pass through a permeable membrane system comprised of at least two permeable membrane sheets, at least one of the two sheets having regularly spaced grooves on at least one surface, said grooves having a predetermined spacing factor, the sheets being positioned in a configuration with the grooves on one grooved surface of one sheet forming feed channels with a surface of another sheet which covers the said one grooved surface, said grooves being about 15 to about 75 mils wide and deep and said feed channels being used to deliver the feed stream to the membrane surface, thereby resulting in a liquid-rich permeate stream and a residual stream enriched in the remaining components of the mixture.

36. A process for the separation of one gas from a mixture comprised of at least two gases which comprises applying sufficient pressure to the mixture to cause a measurable flux of at least one gas through a permeable membrane system comprised of at least two permeable membrane sheets, at least one of the two sheets having regularly spaced grooves on at least one surface, said grooves having a predetermined spacing factor, the sheets being positioned in a configuration with the grooves on one grooved surface of one sheet forming feed channels with a surface of another sheet which covers the said one grooved surface, said grooves being about 0.5 to about 20 mils wide and deep and said feed channels being used to deliver the feed stream to the membrane surface, thereby resulting in a permeate stream enriched in one gas and a residual stream enriched in the remaining gases of the original mixture.

37. A process for liquid-fluid separation of the fluid from a mixture of (a) a liquid and (b) a fluid which is either a liquid or a gas, which process comprises applying sufficient pressure to the solution to overcome the osmotic pressure of the solution and thereby cause the fluid to pass through a permeable membrane system comprised of at least two permeable membrane sheets, at least one of the two sheets having regularly spaced grooves on at least one surface, said grooves having a predetermined spacing factor, the sheets being positioned in a configuration with the grooves on one grooved surface of one sheet forming feed channels with a surface of another sheet which covers the said one grooved surface, said grooves being about 0.5 to about 100 mils wide and deep and said feed channels being used to deliver the feed stream to the membrane surface, thereby resulting in a permeate stream rich in fluid (b) and a residual stream enriched in liquid (a).

38. A continuous process for separating product from fluid reactants and catalyst in a reactor system wherein the catalyst is attached or immobilized onto a permeable membrane or an adjacent surface or is recirculated with reactants across the surface of the permeable membrane and the separation is effected by the ability of the product to selectively pass through a permeable membrane system comprised of at least two permeable membrane sheets, at least one of the two sheets having regularly spaced grooves on at least one surface, said grooves having a predetermined spacing factor, the sheets being positioned in a configuration with the grooves on one grooved surface of one sheet forming feed channels with a surface of another sheet which covers the said one grooved surface, said grooves being about 0.5 to about 100 mils wide and deep and said feed channels being used to deliver the reactants to the membrane surface, thereby resulting in a product-rich permeate stream and a reactant-rich residual stream, which is recirculated through the reactor with additional reactants.

39. A permeable membrane system comprised of at least two sheets, at least one of the two sheets being a permeable membrane having regularly spaced grooves on at least one surface, said grooves having a predetermined spacing factor, one grooved surface having a barrier layer, the sheets being positioned in a configuration with the grooves on the surface of the permeable membrane sheet forming feed channels with a surface of another sheet which covers the said one grooved surface, said grooves being about 0.5 to about 100 mils wide and deep and said feed channels being used to deliver the feed stream to the membrane surface.

* * * * *